United States Patent
Weller

(10) Patent No.: US 11,582,952 B2
(45) Date of Patent: Feb. 21, 2023

(54) PET TOY WITH CHEW HOLDER

(71) Applicant: Lisa Weller, Long Beach, CA (US)

(72) Inventor: Lisa Weller, Long Beach, CA (US)

( * ) Notice: Subject to any disclaimer, the term of this patent is extended or adjusted under 35 U.S.C. 154(b) by 0 days.

(21) Appl. No.: 17/939,957

(22) Filed: Sep. 8, 2022

(65) Prior Publication Data
US 2023/0000056 A1 Jan. 5, 2023

Related U.S. Application Data

(62) Division of application No. 17/117,992, filed on Dec. 10, 2020, now Pat. No. 11,464,208.

(51) Int. Cl.
*A01K 15/02* (2006.01)

(52) U.S. Cl.
CPC .................................. *A01K 15/026* (2013.01)

(58) Field of Classification Search
CPC .... A01K 15/025; A01K 15/026; A01K 15/02; A01K 5/0114
See application file for complete search history.

(56) References Cited

U.S. PATENT DOCUMENTS

| | | | | |
|---|---|---|---|---|
| 6,186,096 B1* | 2/2001 | Miller | .................. | A01K 15/026 119/709 |
| 7,278,374 B2* | 10/2007 | Mann | .................. | A01K 15/026 119/710 |
| 9,999,199 B1* | 6/2018 | Dadalto | ................ | A01K 15/021 |
| 10,582,696 B1* | 3/2020 | Mullin | .................. | A01K 5/0114 |
| 2008/0314331 A1* | 12/2008 | DeGhionno | .......... | A01K 15/025 119/709 |
| 2009/0217885 A1* | 9/2009 | Peter | .................... | A01K 15/025 119/709 |
| 2009/0314221 A1* | 12/2009 | Wang | ................... | A01K 15/025 119/707 |
| 2016/0106068 A1* | 4/2016 | Axelrod | ............... | A01K 15/026 119/710 |
| 2017/0020109 A1* | 1/2017 | Dewey | ....................... | F16B 7/20 |
| 2017/0055498 A1* | 3/2017 | McNulty | ................... | F16B 7/04 |
| 2019/0261601 A1* | 8/2019 | Stone | ................... | A01K 15/025 |
| 2020/0113152 A1* | 4/2020 | Mcfarlane | ............ | A01K 15/026 |
| 2021/0212290 A1* | 7/2021 | Stern | ..................... | A01K 15/026 |

FOREIGN PATENT DOCUMENTS

WO  WO-2006058285 A2 *  6/2006 ........... A01K 15/026

\* cited by examiner

*Primary Examiner* — Trinh T Nguyen

(57) ABSTRACT

In one embodiment, a chew toy includes a first portion that can removably couple to a second portion of the chew toy. An outer surface of the first portion has a first opening to the interior of the chew toy. The second portion includes a first end, and the first end of the second portion includes a first surface for supporting the base of a chew that is larger than the first opening in a plane parallel to the first opening. When the second portion is removably coupled to the first portion the first surface is disposed in the interior of the chew toy and is offset from the first opening along a direction perpendicular to the plane of the first opening.

16 Claims, 4 Drawing Sheets

PET TOY WITH CHEW HOLDER

PRIORITY CLAIM

This application is a divisional of, and claims the benefit under 35 U.S.C. §§ 120-121 of, U.S. patent application Ser. No. 17/117,992, published as U.S. Patent Application Publication No. 2022/0183257 and filed March 10 December 2020, the entirety of which is incorporated herein by reference.

TECHNICAL FIELD

This disclosure generally relates to a pet toy that holds a chew for a pet.

BACKGROUND

Many pets, particularly dogs, express a desire to chew objects. Objects designed for a dog to recreationally chew, which may be referred to as a "chew," can be made from synthetic or natural materials. For example, a synthetic chew may be made of plastic or rubber. However, pets such as dogs may express a preference for chews made of natural materials, such as a rawhide chew, bully sticks, or chews made from other animal parts such as tendons. In addition, synthetic chews may not be designed for ingestion by the pet and may not be digestible, and if the pet consumes a synthetic chew then digestive complications may result. Thus, chews made of natural materials may be preferable to synthetic materials. A pet, such as a dog, may consume a natural chew over time, reducing the size of the chew over time.

BRIEF DESCRIPTION OF THE DRAWINGS

FIG. 1C illustrates an off-center top view of the components of the pet toy shown in

FIG. 1A.

DESCRIPTION OF EXAMPLE EMBODIMENTS

Figure 1A:
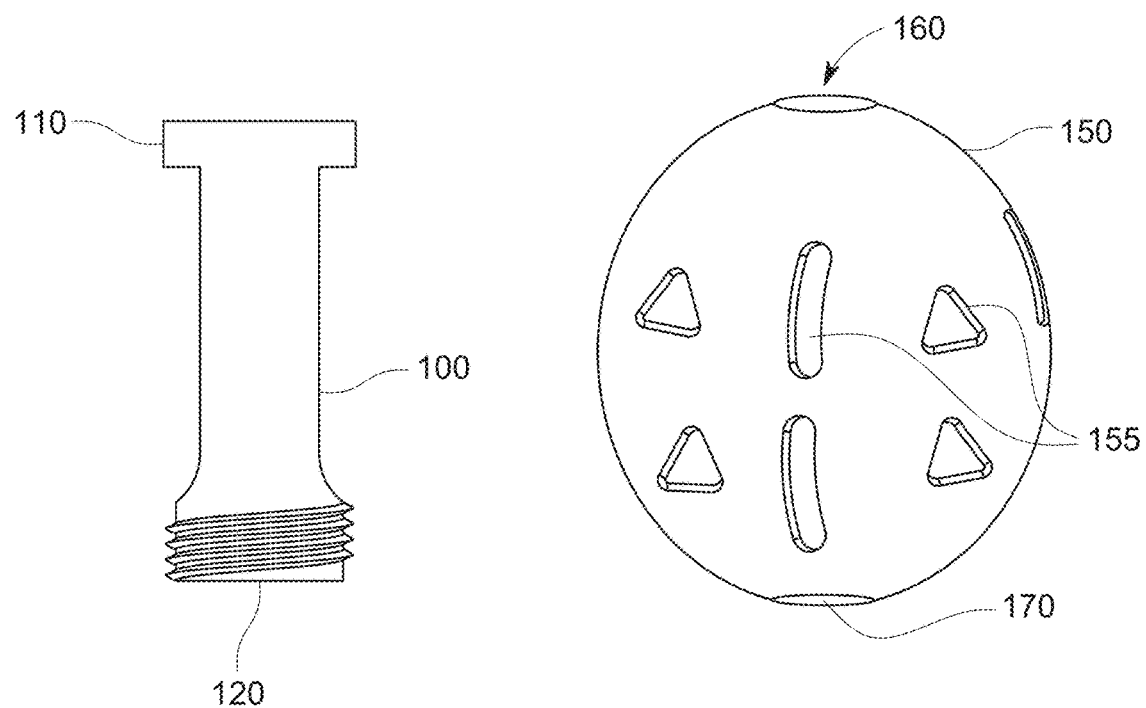
FIG. 1A illustrates an example of a pet toy for securely holding a chew.

FIG. 1A illustrates an example of a pet toy for securely holding a chew, such as a bully stick. The pet toy of FIG. 1A includes a ball 150 that forms the main body of the toy. As shown in FIG. 1A, ball 150 includes a top opening 160 and a bottom opening 170. As shown in FIG. 1A, ball 150 may include cutout shapes 155 on the surface of ball 150. In particular embodiments, cutout shapes 155 may permit treats placed in the interior of ball 150 to exit the ball as, for example, a pet plays with the ball. Thus, in particular embodiments, ball 150 may include an outer shell that is substantially or entirely hollow, permitting pet treats to be placed within the interior of ball 150. As illustrated in FIG. 1A, cutout shapes 155 may take different forms, such as a triangle, an ellipse, a circle, or any other suitable shape. This disclosure contemplates that cutout shapes may or may not be included on a pet toy, or may be included on only a portion of a body of the toy. Moreover, while the example toy of FIG. 1A is a ball, this disclosure contemplates that the pet toys described herein may take any suitable shape. For example, in particular embodiments, a pet toy may take the shape of a bone, a cylinder, etc. This disclosure also contemplates that the pet toy may have various sizes. For example, the diameter of ball 150 shown in FIG. 1A may be, e.g., 4.5 inches, or may be larger or smaller.

As shown in FIG. 1A, the example pet toy includes chew holder 100. As shown in FIG. 1A, chew holder 100 includes a bottom portion 120 and a top portion 110, described more fully herein. As described below, chew holder 100 is removable from ball 150 and can be inserted and securely fixed to ball 150 to safely and securely attach a chew to ball 150.

Figure 1B:
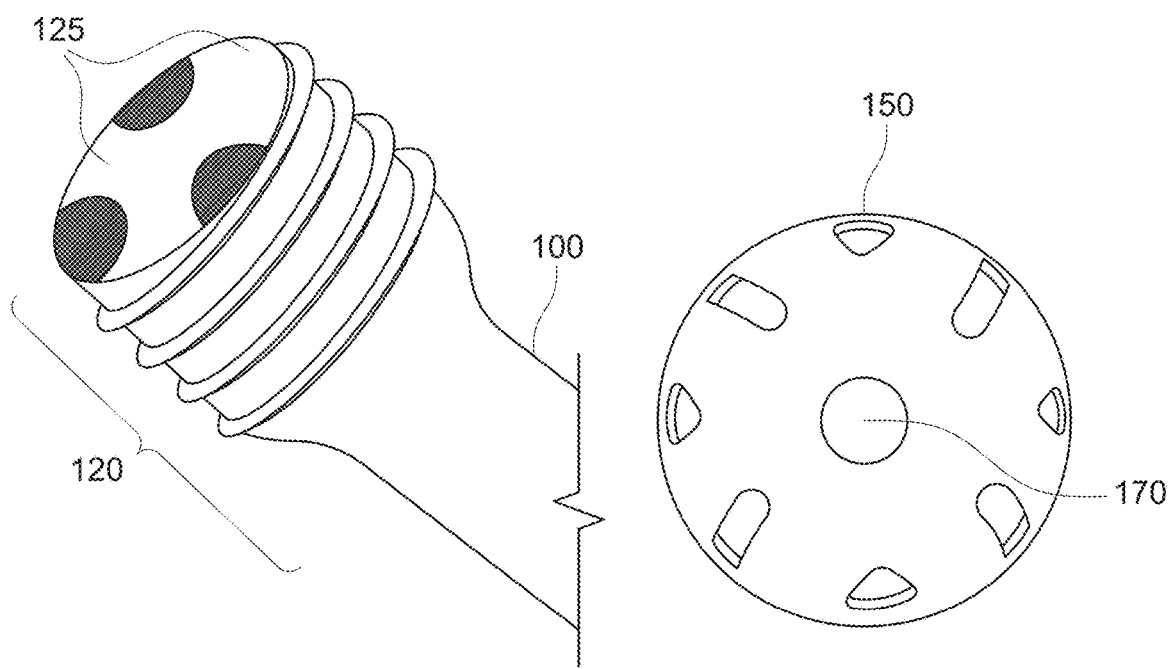
FIG. 1B illustrates an off-center bottom view of the components of the pet toy shown in FIG. 1A.

FIG. 1B illustrates an off-center, bottom view of the components of the pet toy shown in FIG. 1A. The left side of FIG. 1B illustrates an off-center, bottom view of chew holder 100. As shown in FIGS. 1A and 1B, bottom portion 120 of chew holder 100 may include a section that has threads on a portion of the outer surface of chew holder 100. As shown in FIG. 1B, the bottom portion of ball 150 may include bottom opening 170. Similarly, the surface of ball 150 that is formed by bottom opening 170 may include threads for receiving the threads on bottom portion 120 of chew holder 100 for attaching chew holder 100 to ball 150. Thus, in the embodiment show in FIG. 1B, chew holder 100 attaches to ball 150 by inserting top portion 110 into bottom opening 170 of ball 150, pushing chew holder 100 into ball 150, and turning chew holder 100 so that the threads of bottom portion 120 of chew holder 100 screw into the threads of bottom opening 170. As shown in FIG. 1B, the bottom of chew holder 100 may include prongs 125, which form part of the bottom surface of chew holder 100 or may be slightly recessed into the interior of chew holder 100. Bottom opening 170 and bottom portion 120 may have various sizes, provided that, in this example, bottom portion 120 threads snugly into the threads on the outer surface of bottom opening 170. For example, the diameter of bottom opening 170 and of bottom portion 120 may be approximately 1.5 to 3 inches, or any other suitable size.

As shown in FIG. 1B, prongs 125 permit a user to grasp (e.g., using a thumb and two fingers) and turn chew holder 100 into and out of ball 150, because the space between prongs 125 is hollow. For example, in particular embodiments, when chew holder 100 is affixed to ball 150, the bottom surface of chew holder 100 may be flush with or slightly recessed into ball 150, i.e., such that the bottom of chew holder 100 forms the part of the surface of ball 150 that is absent from ball 150 as a result of bottom opening 170.

Chew holder 100 may be difficult or impossible for a pet to remove from ball 150 once chew holder 100 is affixed to ball 150. Because the bottom surface of chew holder 100 sits below or level with the surface of ball 150, there is no protrusion of chew holder 100 which a pet could grasp and pull with, e.g., its teeth. In addition, prongs 125 permit fingers to insert into chew holder 100 and push against prongs 125 to create a rotational force to unscrew chew holder 100 from ball 150, but the size of the holes between chew holders 125 and the lack of digits in pets make it difficult for pets to create the necessary rotational force on chew holder 100 relative to ball 150 to remove chew holder 100 from ball 150.

In particular embodiments, chew holder 100 may be substantially hollow between top portion 110 and bottom portion 120. In particular embodiments, chew holder 100 may be partially or fully filled. While FIG. 1B illustrates three prongs 125 having a particular shape and level with the bottom surface of chew holder 100, this disclosure contemplates that chew holder 100 may have any suitable number of prongs or other components for grasping or manipulating chew holder 100, and further that those prongs may take any suitable shape. For example, chew holder 100 may include a knob (e.g., a rounded handle, a gear-shaped knob, etc.) that extends from or is part of the end of chew holder 100 for inserting and removing chew holder 100 from ball 150, and that knob may be permanently affixed or removable from chew holder 100.

FIGS. 1A and 1B illustrate chew holder 100 having a taper in its body such that bottom portion 120 is larger than at least some of the rest of the body of chew holder 100. For example, bottom portion 120 may be approximately 2.5 inches in diameter, while the body of chew holder 100 may be approximately 1 and 1/16 inches in diameter after the taper. As another example, the body of chew holder 100 may be approximately 3/4 inches in diameter after the taper. In particular embodiments, this taper helps chew holder 100 to easily insert into bottom opening 170 of ball 150, but this disclosure contemplates that chew holder 100 may have any suitable shape with or without taper. Moreover, as described more fully in connection with FIG. 3, this disclosure contemplates that a chew holder (e.g., chew holder 100 in the example of FIGS. 1A-C) may take any suitable shape and may not be entirely or partially removable from at least part of the pet toy. In addition, while the discussion of the example embodiment of FIGS. 1A-B above describes affixing chew holder 100 to ball 150 using threads, this disclosure contemplates any suitable mechanism for securing chew holder 100 to ball 150. For example, a chew holder may attach to a ball by a clipping or locking mechanism, such as a push-activated mechanism, that locks and unlocks by pushing the chew holder into the ball through a hole. As another example, the ball may include a cap (which may be attached to the ball) that the user can pry open, insert the chew holder, and then close to secure the chew holder to the ball. This disclosure contemplates any suitable mechanism for affixing the chew holder to the pet toy. Moreover, while the example of FIGS. 1A-B show bottom opening 170 as being circular and chew holder 100 as being cylindrical, this disclosure contemplates that bottom opening 170 and chew holder 100 may take any suitable shape (which may not necessarily be the same shape as long as chew holder 100 fits into the pet toy). In addition, the shape and size of bottom opening 170 and chew holder 100 may vary based on the shape of the pet toy.

Figure 1C:
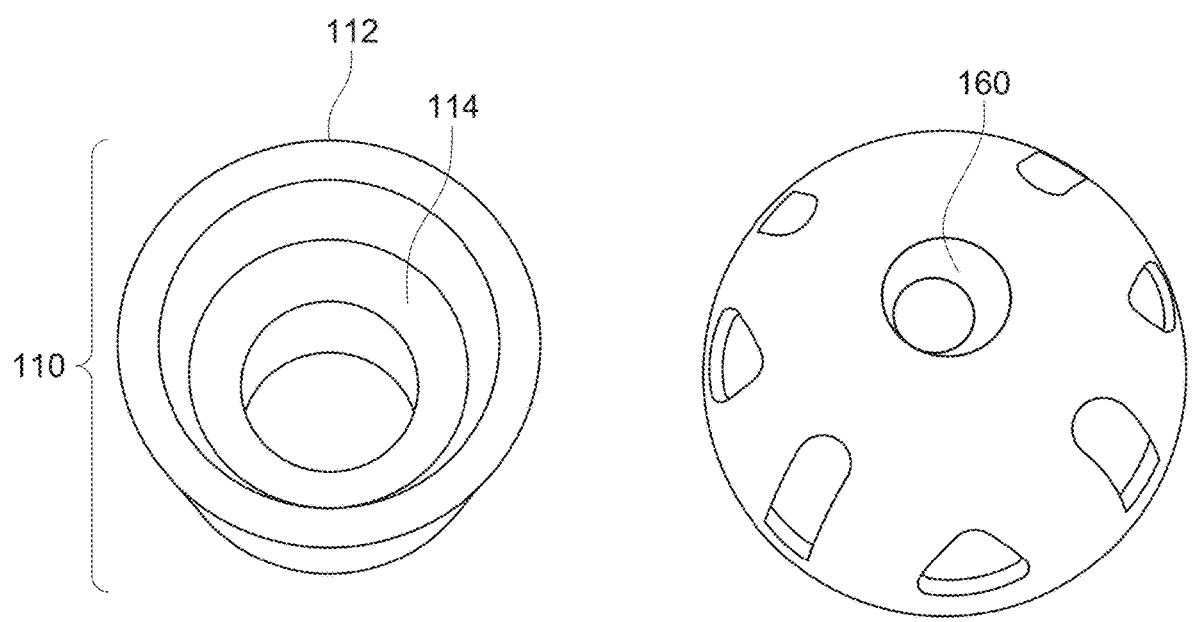

FIG. 1C illustrates an off-center top view of chew holder 100 and ball 150. As shown on the right of FIG. 1C, ball 150 includes a top opening 160. In the example of FIGS. 1A-C, top opening 160 is opposite bottom opening 170 along the diameter of ball 150. As shown on the left of FIG. 1C, chew holder 100 includes a top portion 110. Top portion 110 of example chew holder 100 includes a rim 112 connected by walls to a base 114. As shown in FIG. 1C, base 114 and rim 112 (as well as the walls leading from base 114 to rim 112) form an opening in top portion 110 of chew holder 100. As explained more fully below in connection with FIG. 2, in the example of FIGS. 1A-C, this opening holds the base of the chew within the pet toy.

Chew holder 100 may be partially, fully, or substantially hollow throughout its length, or may be primarily solid. The opening in top portion 110 formed by base 114 and rim 112 may be approximately 1 inch in diameter, and the hole illustrated in base 114 may be approximately 1/4 inch in diameter. The body of chew holder 100 may be 1 and 1/16 inches in diameter and may be hollow, such that chew holder is hollow below base 114 (i.e., moving from top portion 110 to bottom portion 120 of chew holder 100). In particular embodiments, the walls leading from base 114 to rim 112 may be approximately 1/2 inch in length, creating a cylindrical opening that is, e.g., 1 inch in diameter by 1/2 inches in length. Rim 112 may take any suitable thickness, such as for example a thickness of 1/8 inch. When chew holder 100 is hollow throughout its length, 1/8 inch may also be the thickness of the materials forming the body of the chew holder. However, this disclosure contemplates that the thickness of the chew holder may vary along its length and may be more or less hollow along its length, e.g., to balance the toy so that the center of mass of the pet toy when the chew holder is inserted into the ball runs approximately through the center of the ball.

Figure 2:
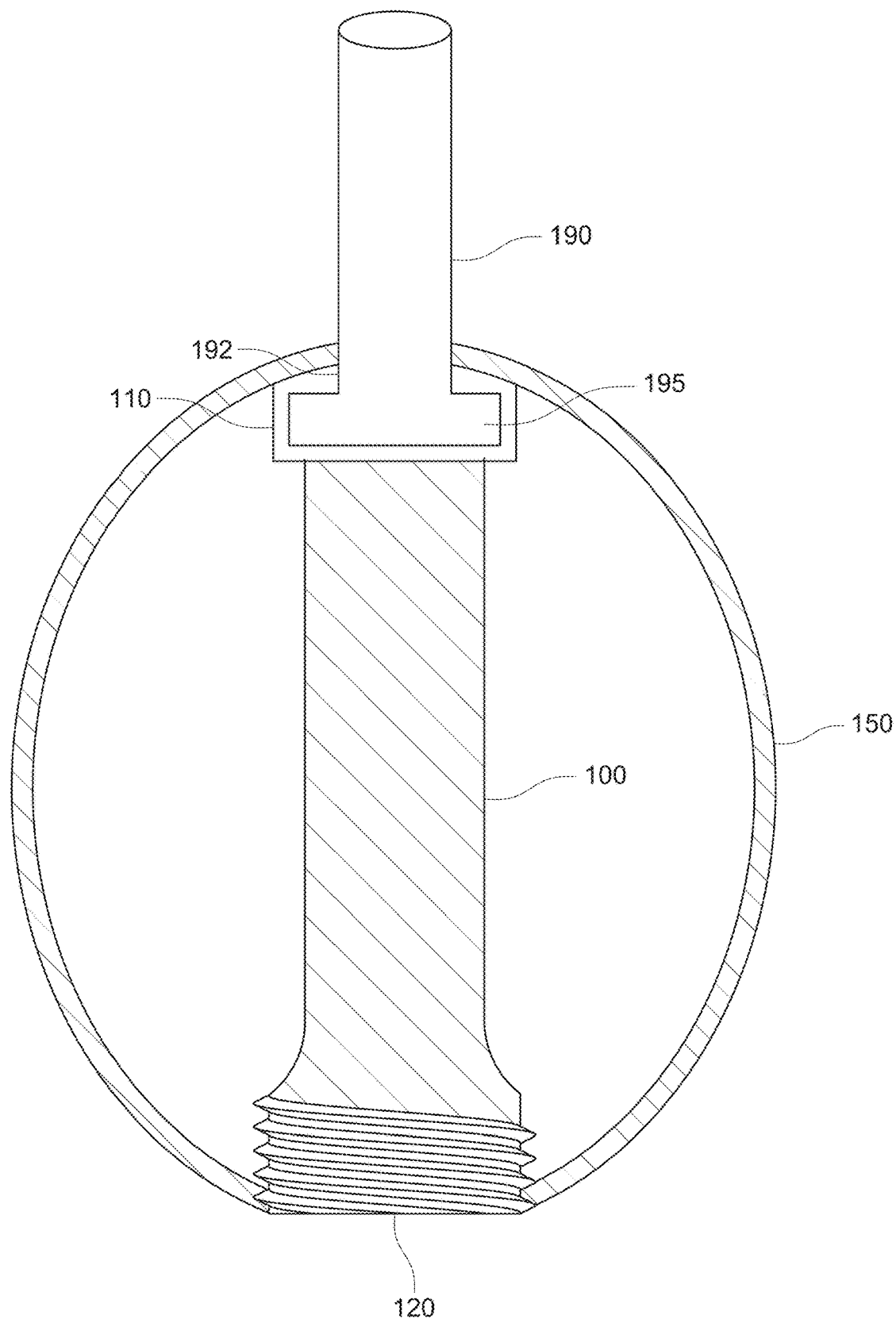
FIG. 2 illustrates a cut-out side view of the assembled pet toy shown in FIG. 1A.

FIG. 2 illustrates a cut-out side view of an example pet toy. The pet toy of FIG. 2 holds chew 190. As shown in FIG. 2, chew 190 includes a chew base 195 that sits within the opening of top portion 110 of chew holder 100 illustrated in FIG. 1C. In the example of FIG. 2, the majority of chew 190 extends outside of ball 150 and is accessible to be chewed by a pet. A portion 192, which includes base 195, of chew 190 sits within ball 150, and therefore is not accessible by the pet. That is, a pet can chew 190 until chew 190 is substantially flush with the upper surface of ball 150. Thus, while the pet can reduce chew 190 while chew 190 extends from ball 150, the pet cannot put the entirety of chew 190 in its mouth when chew 190 is reduced to a size that represents a choking hazard to the pet (which, as explained below, may be the size of portion 192, which includes base 195), because chew 190 is affixed to the inner portion of ball 150. The pet cannot consume ball 150, and therefore when the pet reduces chew 190 to a size at which the pet may choke, the pet cannot choke on chew 190 because it is affixed to ball 150. As shown with reference to FIGS. 1A, 1C, and 2, top portion 110 of chew holder 100 sits below top opening 160 of ball 150 when chew holder 100 is affixed to ball 150, i.e., the chew-holder opening in top portion 110 is in the plane parallel to top opening 160 but is offset from top opening 160 in a direction below (given the orientation of the pet toy in FIG. 2) and perpendicular to the plane of top opening 160.

In particular embodiments, the size of chew portion 192 that the pet cannot access (as portion 192 extends from the upper surface of ball 150 to the bottom of base 195 within the interior of the ball) is smaller than the size at which a pet typically risks choking. Thus, after a pet chews chew 190 flush with ball 150, the pet owner can remove unchewed portion 192 (which includes base 195) from the pet toy and give that portion to the pet, both reducing choking risk and the typical waste associated with having to throw away a portion of a chew once it is reduced to a size that the pet could choke on. In the example embodiment of FIG. 2, the height of portion 192 is approximately equal to the height of the chew holder opening in top portion 110 and the thickness of the surface of ball 150 (or substantially equal to those dimensions, as, e.g., there may be a small gap between rim 112 of chew holder 100 and the interior surface of ball 150 when chew holder 100 is affixed to ball 150). For example, as described above, the chew holder opening in top portion 110 may have a height of 1/2 inch, and the thickness of ball 150 may be 1/8 inch, so that the height of portion 192 may be 5/8 inch. In this example, the height of base 195 may be 1/2 inch. This disclosure contemplates, however, larger and smaller sizes for portion 192, base 195, the height of the chew holder opening in top portion 110, and the thickness of ball 150.

As described above, the chew-holder opening in top portion 110 may be a cylinder having a 1-inch diameter and a ½-inch length, and base 195 of chew 190 may have substantially similar dimensions. In particular embodiments, the width of base 195 of chew 190 may be sized slightly larger than the diameter of the chew-holder opening in top portion 110 so that base 195 snuggly squeezes into that opening. In particular embodiments, the width of base 195 of chew 190 may be sized the same as or slightly smaller than the diameter of the chew-holder opening in top portion 110.

When chew 190 is secured to the pet toy as shown in FIG. 2, the size of chew base 195 (and therefore the chew-holder opening in top portion 110 of chew holder 100) and the size of rim 112 in the dimensions parallel to the plane of top opening 160 are larger than the diameter of top opening 160. For example, the diameter of the chew-holder opening in top portion 110 may be 1 inch, and base 195 may have a substantially similar diameter, while the diameter of top opening 160 may be ¾ inches, or less. This configuration ensures that chew 190 is not removable from ball 150 through top opening 160. In other words, as discussed more fully below, a force parallel to the body of chew holder 100 in FIG. 2 will not pull chew 190 through top opening 160 of ball 150 because that force would cause base 195 of chew 190 or rim 112 of chew holder 100 (or both) to contact and press against the interior, rigid upper surface of ball 150 near top opening 160. Thus, while the majority of the body of chew 190 is small enough, relative to the size of top opening 160, to extend through top opening 160, the width of base 195 of chew 190 is larger than the diameter of top opening 160, ensuring that the entire chew 190 cannot be removed from ball 150 when chew holder 100 is affixed to ball 150.

As explained above, in the example embodiment of FIG. 2. a force parallel to the body of chew holder 100 is insufficient to pull chew 190 through top opening 160 of ball 150 when chew holder 100 is secured to ball 150, as the width of base 195 of chew 190 is larger than the diameter of top opening 160 of ball 150. As shown in the example embodiment of FIG. 2, base 195 of chew 190 may be secured within a chew holder opening of top portion 110 of chew holder 100, formed at least in part by the walls leading to rim 112 of chew holder 100. In particular embodiments, base 195 of chew 190 fits snuggly within the chew holder opening of top portion 110 of chew holder 100, such that there is some frictional force between base 195 of chew 190 and the walls that lead to rim 112. In particular embodiments, the chew holder opening of top portion 110 may be sized so that base 195 of chew 190 simply rests within the opening, without being squeezed by the walls of top portion 110 that form the opening.

As shown in FIGS. 1C and 2, when chew 190 is secured to ball 150 by chew holder 100, chew 190 cannot be pushed out of ball 150 through bottom opening 170 by a downward force parallel to the body of chew 190. For example, as shown in FIGS. 1C and 2, a force on chew 190 in that direction would result in a force by base 195 of chew 190 on base 114 of top portion 110 of chew holder 100. In the example of FIG. 2, this would ultimately result in a force between bottom portion 120 of chew holder 100 and ball 150. For example, when chew holder 100 is threaded into bottom opening 170 of ball 150 as discussed in connection with FIG. 1B, the threadings between bottom portion 120 and the interior surface of bottom opening 170 prevent chew holder 100, and thus chew 190 when affixed to ball 150, from being pushed out of ball 150. Moreover, when a pet attempts to pull or push chew 190 out of the pet toy, the force preventing the pet from doing so is distributed along the surface of ball 150 near top opening 160 and bottom opening 170, respectively. And if a pet were to exert a force on chew 190 perpendicular to the body of chew 190 (i.e., parallel to the plane of opening 160), then chew 190 is held in place by the rigidity of ball 150 near top opening 150, by the contact between chew 190 and the inner surface of ball 150 and/or between top portion 110 of chew holder 100 and the inner surface of ball 150, or both.

FIG. 1C and FIG. 2 illustrate chew holder 100 as having an opening that receives chew base 195 of chew 190. However, this disclosure contemplates any suitable form for securing chew base 195 of chew 190 to ball 150. For example, rather than having an opening in the top portion 110 of chew holder 100, a chew holder may have a surface flush with rim 112 on which chew base rests. That surface may be rim 112 itself, or may be a surface that extends partially or entirely along the top portion of chew holder 100 (e.g., a surface in the plane of rim 112 extending over what is illustrated as the chew holder opening in top portion 110). In such embodiments, chew base 195 is still larger than top opening 160, and therefore chew 190 is secured to ball 150 and cannot be pulled through top opening 160. In particular embodiments, a chew holder such as chew holder 100 may be partially or entirely hollow along its length.

While FIGS. 1A-C and FIG. 2 show top opening 160, chew 190, chew base 195, chew holder opening of top portion 110, and rim 112 as all having a circular shape, in some embodiments all or some of those components (when present) may not have a circular shape. In particular embodiments, some of those components may have a different shape than other of those components. For example, rim 112 may be circular, while chew base 195 and the chew holder opening of top portion 110 may have a rectangular shape. As another example, chew base 195 may have a rectangular shape while the body of chew 190 has a circular shape. As another example, the body of chew 190 and top opening 160 of ball 150 may have a rectangular, triangular, or star-like shape. However, in other embodiments top opening 160 and the body of chew 190 may have a different shape, as long as chew body 190 fits through top opening 160. As explained above, in each of these embodiments base 195 of chew 190 is larger than top opening 160, preventing chew 190 from being pulled out of ball 150 through top opening 160. For example, base 195 (and, the chew holder opening of top portion 110), may have a diameter of 1-2 inches, while the diameter of top opening 160 and the diameter of the body of chew 190 above base 195 may be approximately ¾ inch.

While FIG. 2 illustrates top portion 110 of chew holder 100 as being larger than (and indeed, holding within it) base 195 of chew 190, this disclosure contemplates that base 195 may be larger than top portion 110 of chew holder 100. For example, at least part of the bottom of base 195 may contact the top surface of chew holder 100, which may press at least part of the top of base 195 against the interior surface of ball 150. In particular embodiments, a chew holder may not have a top portion with a base such as base 114 illustrated in FIG. 1C, even if the chew holder has an opening in the top portion of the chew holder, as illustrated by that figure. Instead, for example, the chew may contact the top surface of the chew holder (e.g., rest on rim 112 in FIG. 1C) or may squeeze into the body of the chew holder, which, in particular embodiments may be tapered along its length. For example, an upper portion of the chew holder may be tapered such that chews of different shapes may be pushed into the body and securely fastened by the chew holder.

While FIGS. 1B and 2 illustrate bottom opening 170 and the bottom portion 120 as being circular, this disclosure contemplates that bottom opening 170 (if present, as explained below) and the bottom portion of a chew holder may not have a circular shape, and may take different shapes. For example, while the bottom hole and the bottom portion of a chew holder would have a circular shape if the chew holder fastened to the ball using threads, other shapes (e.g., rectangular, triangular, etc.) may be used with other fastening mechanisms. Moreover, while FIGS. 1A-C and 2 illustrate chew holder 100 as having a circular shape throughout its length (i.e., chew holder 100 as being cylindrical), this disclosure contemplates that a chew holder may have any suitable shape, and that its shape may vary along its length, as appropriate.

In the example of FIGS. 1A-C and FIG. 2, a user assembles the example pet toy by inserting a base of a chew into the chew holder opening formed by upper portion 110 of chew holder 100. The user then inserts the chew, followed by chew holder 100, through bottom opening 170 in ball 150 so that the body of the chew extends outside of ball 150 through top opening 160 (e.g., as shown by chew 190 in FIG. 2). The user then attaches chew holder 100 to ball 150, e.g., as in FIG. 2 by turning the threads of bottom portion 120 of chew holder 100 into the threads of bottom opening 170. Disassembly is performed by the opposite sequence of steps. This disclosure contemplates that, for other embodiments, some of the steps may be different than those described above. For example, when an upper portion of a chew holder is a platform for supporting a base of a chew, a user may first insert the chew through the bottom and top openings of a ball, and then insert the chew holder through the bottom opening to support the base of the chew and, in some embodiments, compress the base of the chew against the inner surface of the ball.

While FIGS. 1A-C and FIG. 2 illustrate a pet toy as having a single chew holder for holding a single chew, this disclosure contemplates that a pet toy may have more than one chew and/or may have more than one chew holder. For example, a bone-shaped pet toy may have multiple chew holders, each holding a chew, arranged perpendicular to the length of the bone. As another example, with reference to FIG. 3, chew holder 320 may be a y-shaped chew holder, capable of supporting a chew at each end of the "y," and instead of a single top hole 310 the toy may have a hole associated with each chew in the outer surface of the ball. This disclosure contemplates that a pet toy may not be limited to a single chew holder and a single chew.

Figure 3:
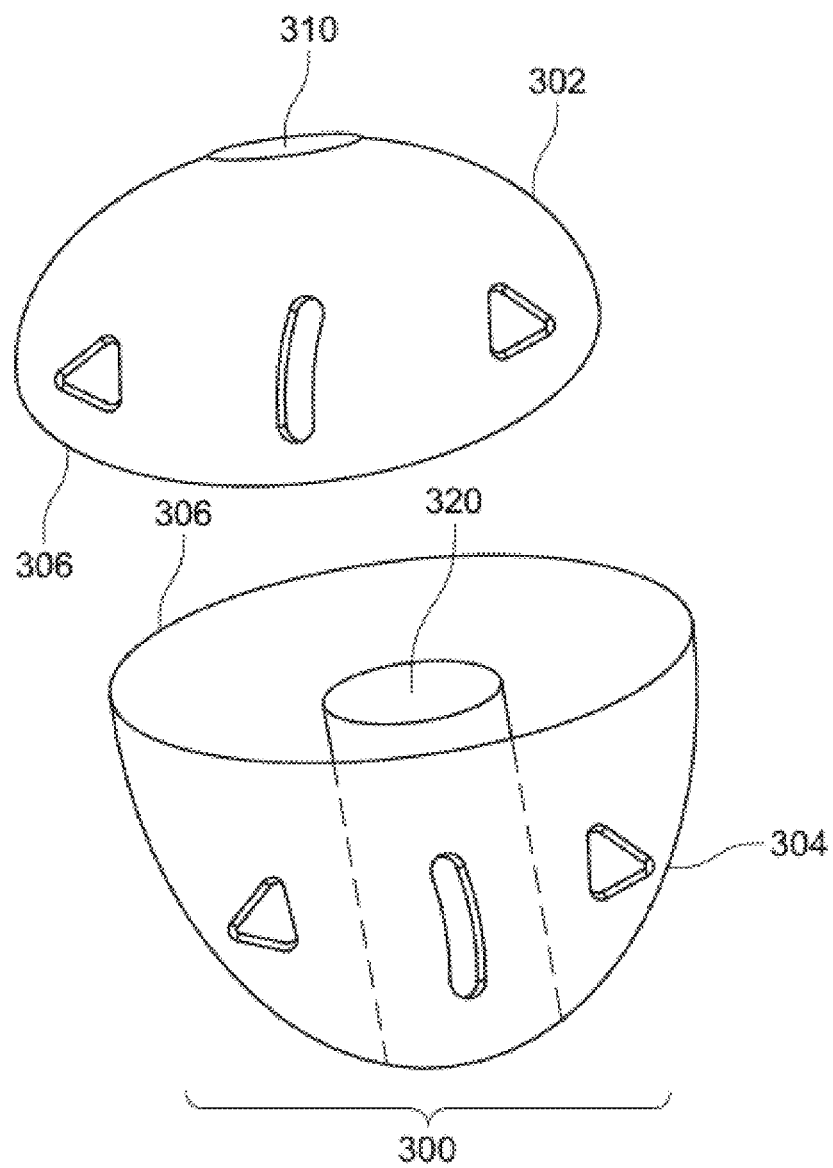
FIG. 3 illustrates an alternative embodiment of a pet toy with a chew holder.

FIG. 3 illustrates an alternative embodiment of a pet toy with a chew holder. In the example of FIG. 3, a pet toy includes a ball 300 that includes an upper portion 302 and a lower portion 304. Unlike the ball illustrated in FIG. 2, in which ball 150 is a single component (e.g., is molded into a single piece), the ball of FIG. 3 includes two subcomponents that can be disassembled and reassembled along seams 306. For example, seams 306 may include threads that allow a user to screw and unscrew upper portion 302 and lower portion 304 from each other. Similarly, seams 306 may include components for snapping and unsnapping upper portion 302 from lower portion 304. This disclosure contemplates that any suitable mechanisms may be used for separating a pet toy, such as the ball of FIG. 3, into separate components. Moreover, while the example of FIG. 3 illustrates each of upper portion 302 and lower portion 304 as a half-sphere, this disclosure contemplates that subcomponents of a pet toy may take other shapes.

As shown in FIG. 3, pet toy 300 includes a chew holder 320. In the example of FIG. 3, chew holder 320 is affixed to lower portion 304 of ball 300. Thus, unlike ball 150 of FIG. 2, the ball of FIG. 3 does not have a bottom opening.

In the example of FIG. 3, a user may remove upper portion 302 from lower portion 304 to reveal a permanently affixed chew holder 320, insert the chew into or onto the holder, feed the chew through top opening 310, and reassemble upper portion 302 to lower portion 304. In the example of FIG. 3, a chew would extend from top opening 310 of ball 300. As explained above, the base of the chew is large enough relative to the diameter of top opening 310 so that it cannot be pulled out of top opening 310. Likewise, the chew is secured to pet toy 300 by chew holder 320. For example, chew holder 320 may include a surface on which the base of the chew rests when inserted into pet toy 300, or chew holder 320 may include an opening (e.g., similar to that shown in FIG. 1C), for holding the base of a chew. As explained above, assembled pet toy 300 ensures that a chew cannot be removed from pet toy 300 and that a pet cannot access a small portion of a chew that presents a choking hazard. For example, a pet reducing a chew used in connection with pet toy 300 can only reduce the chew to flush with the upper surface of upper portion 302 formed by top opening 310.

As explained above, while FIG. 3 illustrates pet toy 300 as being a ball, this disclosure contemplates a pet toy may take any suitable shape. Likewise, while FIG. 3 illustrates chew holder 320 as being permanently affixed to pet toy 300, this disclosure contemplates that chew holder 320 may be a removable component from a pet toy, e.g., a chew holder that removably slides over a post affixed with ball 300. As explained above, this disclosure contemplates that top opening 310, a chew, and a chew holder 320 may take any suitable shape, provided that the base of the chew is larger than top opening 310 so that the base of the chew cannot be pulled from the pet toy through top opening 310.

While FIG. 3 illustrates upper portion 302 and lower portion 304 of ball 300 as attaching via seams 306, this disclosure contemplates that upper portion 302 and lower portion 304 may additionally or alternatively attach via threads on the upper portion of the outer surface of chew holder 320 and threads on the inner surface of top opening 310 of upper portion 302. In these embodiments, the base of the chew would sit below the upper portion of chew holder 320. For example, in particular embodiments, a user may attach upper portion 302 to lower portion 304 by simultaneous turning threads on seams 306 into each other and threads on an upper portion of chew holder 320 into threads on an inner surface of top opening 310. Securing the subcomponents of the pet toy at two or more distinct portions of the toy may make a pet, such as a dog, less likely to inadvertently open the toy and remove the chew from the toy while playing with the toy.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
    inserting a body of a chew through a first opening in a first portion of a chew toy such that at least a part of the body of the chew extends outside of the chew toy; and
    removably coupling a second portion of the chew toy to the first portion such that:
        a first end of the second portion comprising a first surface secures a base of the chew, that is larger than the first opening in a plane parallel to the first opening, against an inner surface of the first portion within the interior of the chew toy; and
        the first surface is disposed in the interior of the chew toy and is offset from the first opening along a direction perpendicular to the plane of the first opening.

2. The method of claim 1, wherein:
    the first end of the second portion forms a chew-holder opening defined by an at least partially solid base coupled to walls that are coupled to a rim at a terminal end of the first end of the second portion;
    the at least partially solid base comprises the first surface for securing the base of the chew and the chew-holder opening is larger than the first opening in the plane parallel to the first opening; and
    the method further comprises inserting the base of the chew into the chew-holder opening of the first end of the second portion before inserting the body of the chew through the first opening in the first portion of the chew toy.

3. The method of claim 2, wherein the chew-holder opening comprises a cylindrical shape.

4. The method of claim 2, wherein the chew-holder opening is larger, in the plane parallel to the first opening, at the rim than at the at least partially solid base.

5. The method of claim 2, wherein the chew-holder opening comprises a shape that is different than a shape of the first opening.

6. The method of claim 2, wherein the second portion further comprises a second end opposite the first end of the second portion, and the second end removably couples the second portion to the first portion.

7. The method of claim 6, wherein:
    the second end comprises threads on an outer surface of the second end;
    the first portion further comprises a second opening in the outer surface, the second opening being opposite the first opening and having threads on a surface of the second opening for receiving threads of a second end of the second portion, wherein the second opening is larger than the first opening;
    the method further comprises inserting the body of the chew and the first end of the second portion holding the base the chew through the second opening into the interior of the first portion; and
    removably coupling the second portion of the chew toy to the first portion comprises coupling the threads of the second end of the second portion into the threads of the second opening of the first portion.

8. The method of claim 7, wherein the second end of the second portion further comprises a plurality of prongs for twisting the second portion relative to the first portion.

9. The method of claim 2, wherein the first portion comprises a spherical shape and the second portion comprises a body having a cylindrical shape.

10. The method of claim 9, wherein the body is at least partially hollow.

11. The method of claim 1, wherein the first portion comprises a single component.

12. The method of claim 1, wherein the first portion comprises a first subportion removable coupled to a second subportion.

13. The method of claim 12, wherein the first subportion and the second subportion each comprise a half-sphere.

14. The method of claim 1, wherein the first portion of the chew toy further comprises a plurality of second openings to the interior of the chew toy.

15. The method of claim 1, wherein the first end of the second portion comprises a terminal end having a solid surface parallel to the first opening.

16. The method of claim 1, wherein when the first portion is removably coupled to the second portion a distance between the first surface and the first opening is less than one inch.

* * * * *